United States Patent [19]

Seko et al.

[11] Patent Number: 4,509,040
[45] Date of Patent: Apr. 2, 1985

[54] ALARM SYSTEM FOR PREVENTING AN AUTOMOTIVE VEHICLE DRIVER FROM DOZING AT THE WHEEL

[75] Inventors: Yasutoshi Seko, Yokohama; Masami Inoue; Takayuki Yanagishima, both of Yokosuka, all of Japan

[73] Assignee: Nissan Motor Company, Limited, Japan

[21] Appl. No.: 326,393

[22] Filed: Dec. 1, 1981

[51] Int. Cl.³ .............................................. G08B 21/00
[52] U.S. Cl. ..................... 340/576; 180/272; 340/575
[58] Field of Search ............... 340/575, 576, 52 R, 340/52 D, 53; 180/272; 128/719

[56] References Cited

U.S. PATENT DOCUMENTS

| | | |
|---|---|---|
| 3,106,981 | 10/1963 | Chakiris . |
| 3,222,639 | 12/1965 | Kayser, Jr. . |
| 3,654,599 | 4/1972 | Sepper . |
| 3,794,969 | 2/1974 | Klopfenstein et al. . |
| 3,877,541 | 4/1975 | Takeuchi et al. ............... 180/272 |
| 3,938,612 | 2/1976 | Boudeville et al. . |
| 3,980,999 | 9/1976 | Nishioka et al. . |
| 4,005,398 | 1/1977 | Inoue et al. . |
| 4,007,357 | 2/1977 | Yanagishima ............... 340/52 R |
| 4,017,843 | 4/1977 | Yanagishima . |
| 4,031,527 | 6/1977 | Yanagishima et al. . |
| 4,058,796 | 11/1977 | Oishi et al. . |
| 4,104,621 | 8/1978 | Yanagishima et al. . |
| 4,278,969 | 6/1981 | Woods . |

FOREIGN PATENT DOCUMENTS

| | | |
|---|---|---|
| 156725 | 6/1980 | Japan . |
| 54-65428 | 12/1980 | Japan ........................... 340/576 |

Primary Examiner—Glen R. Swann, III
Attorney, Agent, or Firm—Lowe, King, Price & Becker

[57] ABSTRACT

An alarm system for a vehicle driver to prevent from dozing at wheel. The system includes structure for detecting drowsiness of the driver on a basis of abnormal steering change repetitions for a fixed period of time in a monotonous driving state defined, for example, as the transmission gear position being maintained at an overdrive or top position. The alarm system produces an alarm to the driver to prevent the driver from increasing the state of drowsiness. The drowsiness alarm system according to the present invention comprises a steering signal generator which generates a signal corresponding to the change of an angle through which the steering wheel is rotated, a monotonous driving-state detector which detects and signals that the vehicle is traveling in a monotonous driving state, a discriminator which compares the change of steering signal level from said steering signal generator for a fixed period of time with a reference value, and an alarm pulse generator which outputs an alarm pulse into an alarm circuit producing an alarm in response to the input alarm pulse when the output signal from the discriminator indicating the change of steering signal for the fixed period of time exceed the reference voltage.

19 Claims, 9 Drawing Figures

ALARM SYSTEM FOR PREVENTING AN AUTOMOTIVE VEHICLE DRIVER FROM DOZING AT THE WHEEL

BACKGROUND OF THE INVENTION

The present invention relates generally to an alarm system for use in an automotive vehicle for giving an alarm when drowsiness of a driver is detected, to prevent the driver from dozing at the wheel. More particularly, the invention relates to an alarm system which detects drowsiness of the driver on a basis of abnormal steering operation.

Vehicle drivers are apt to feel drowsy during relatively high speed cruising such as cruising on a highway. The drowsy driver may make abnormal steering operations which, otherwise, will not be made in normal driving condition. There are some typical abnormal steering operations which the drowsy driver is apt to make. Therefore, if such abnormal steering operations can be detected based on a vehicle operating condition, an alarm can be given to the driver to prevent the driver from dozing at the wheel.

Drowsiness of the driver or falling asleep of the driver can be detected by detecting variation of certain parameters into an abnormal range. For example, since the steering angle variable is unnecessarily increased when the driver feels drowsy or falls asleep, drowsiness of the driver can be detected by detecting a steering angle variation in steering which is larger than the steering angle variations in normal driving conditions. On the other hand, even if the steering angle variable exceeds the normal range, it should still be considered as a normal driving condition if the vehicle transmission is frequently shifted. Further, since the normal steering angle range is inversely proportional to the vehicle speed, i.e., the range of the normal steering angle will become smaller as the vehicle speed increases, the vehicle speed or other parameter representative of vehicle speed higher than a predetermined vehicle speed will be considered as one of parameter to detect drowsiness of the driver.

SUMMARY OF THE INVENTION

Therefore, it is an object of the invention to provide a drowsiness alarm system for an automotive vehicle which includes means for effectively and successfully detecting drowsiness of the driver.

Another object of the invention is to provide a drowsiness detecting means for a drowsiness alarm system which detects drowsiness of the driver on a basis of a steering angle variable and the transmission gear position.

A further and more specific object of the present invention is to provide abnormal steeing angle variable detecting means, which detects a steering angle variable having a value more than a predetermined value and detects a steering angle varying rate higher than a predetermined rate.

In accordance with the principles of the present invention, the alarm system is operative when the steering angular position is varied in excess of a predetermined magnitude when the vehicle speed is higher than that of predetermined value and when the transmission is maintained at a relatively high gear position. The varying of steering angular position is detected by a steering angle detector, and the varying speed and varying magnitude of the steering angular position is detected by a discriminator including a level detector for detecting signal levels of the steering angle detector in relation to a threshold value.

According to one embodiment of the present invention, there is provided an alarm system for preventing an automotive vehicle driver from dozing at the wheel, which system comprises a steering angle detector for detecting the angular position of steering from a neutral position thereof and for producing a first signal value which is proportional to the detected steering angle, a discriminator detecting the first signal value exceeding a threshold value and detecting a varying rate of the steering angular position larger than a predetermined rate, which discriminator produces a discriminator signal when the first signal value exceeds the threshold value and the varying rate is larger than the predetermined rate, a counter counting up the discriminator signal and producing an alarm signal when the counted value reaches a preset value, a counter enable signal generator associated with said counter and producing a counter enabling signal while a preselected steady cruising condition is satisfied, which enabling signal makes the counter operative to count up the discriminator signal while it is present and otherwise disables the counter operation and clears the counter value, and an alarm device responsive to the alarm signal to produce an alarm for preventing the driver from dozing at wheel.

BRIEF DESCRIPTION OF THE DRAWINGS

The present invention will be more fully understood from the detailed description given herebelow and from the accompanying drawings of the preferred embodiment of the present invention, which, however, should not be taken as limitative to the invention but for elucidation and explanation only.

In the drawings.

DESCRIPTION OF THE PREFERRED EMBODIMENT

Figure 1:
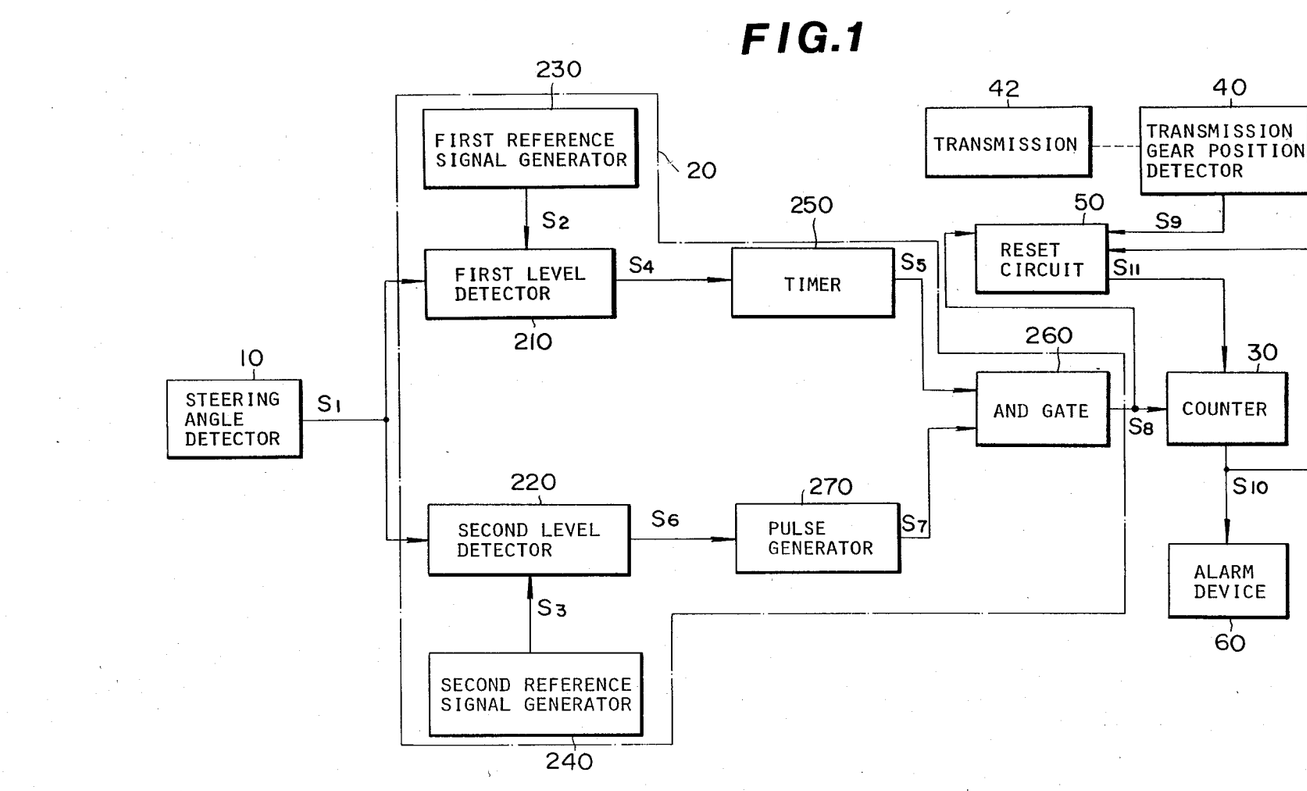
FIG. 1 is a block diagram of the preferred embodiment of a drowsiness alarm system of the present invention.

Referring now to the drawings, particularly to FIG. 1, there is illustrated the preferred embodiment of an alarm system for preventing an automotive vehicle driver from dozing at the wheel. The alarm system includes a steering angle detector 10 which detects changes or shifts in the steering angle from a neutral position and produces a steering angle signal $S_1$ having a value proportional to the detected steering angular position relative to the neutral steering position. The steering angle detector 10 may comprise a simple potentiometer device.

It should be understood that, although the specific embodiment uses the steering angle detector 10 for detecting the steering variable, the steering variable may be otherwise detected by using other suitable detectors which detect, for example, steering force, yawing magnitude, centrifugal force and so forth. For example, co-pending U.S. patent application Ser. No. 177,995, filed Aug. 14, 1980, now U.S. Pat. No. 4,342,279 by Yashutoshi Seko et al discloses a steering angle detector which produces a pulse signal at every predetermined steering angular position. The disclosure of U.S. patent application Ser. No. 177,995 is incorporated to the present application by reference.

A discriminator 20 receives the steering angle signal $S_1$. The discriminator 20 is adapted to detect a value of the steering angle signal $S_1$ above a threshold value to produce a discriminator signal $S_8$. The discriminator 20 has first and second level detectors 210 and 220 which are respectively connected with first and second reference signal generators 230 and 240 producing first and second reference signals $S_2$ and $S_3$ having constant values respectively representative of first and second threshold values. As is apparent from FIG. 2, the first reference signal generator 230 produces a first reference signal $S_2$ having a smaller value than that of the second reference signal $S_3$. The first level detector 210 compares the sensor signal value $S_1$ and the first reference signal value $S_2$ to produce a first detector signal $S_4$ when the sensor signal value is larger than the first reference signal value $S_2$. A timer 250 is responsive to the first level detector signal $S_4$ to produce a timer signal $S_5$ having a predetermined constant duration. The timer signal $S_5$ is fed to an AND gate 260. On the other hand, at the same time, the second level detector 220 compares the sensor signal value $S_1$ and the second reference signal values $S_3$ to produce a second level detector signal $S_6$ when the sensor signal value $S_1$ is larger than the second reference signal value $S_3$. A pulse generator 270 is responsive to the second level detector signal $S_6$ to produce a relatively short duration pulse signal $S_7$ upon receiving the second level detector signal. The AND gate 260 is responsive to the pulse signal $S_7$ and when the timer signal $S_5$ is received at the same time produces an output which serves as discriminator signal $S_8$.

The discriminator signal $S_8$ is fed to a counter 30 which counts up the discriminator signal to produce an alarm signal $S_{10}$ when the counted value becomes equal to a preset value.

The counter 30 is further connected to a reset circuit 50 which is, in turn, connected with the AND gate 260. The reset circuit 50 is a timer which produces a reset signal $S_{11}$ a preset time lag $P_3$ (See FIG. 3) after receiving the discriminator signal $S_8$. The time lag preset in the reset circuit 50 defines an operation time of the counter 30. The counter 30 is responsive to the reset signal $S_{11}$ to clear the counter value. Therefore, the counter 30 will produce the alarm signal $S_{10}$ when the preset number of discriminator signals are inputted within the preset time duration. The reset circuit 50 is further connected with a transmission gear position detector 40. The transmission gear position detector 40 detects top gear position and/or over-drive gear position of the transmission and produces a gear shift signal $S_9$ when the transmission gear is shifted into or out of the top gear or over-drive gear position. The reset circuit 50 is responsive to the gear shift signal $S_9$ to produce the reset signal $S_{11}$ for resetting the counter 30 and clearing the counter value. Also, the reset circuit 50 is connected with the output terminal of the counter 30 to receive alarm signal $S_{10}$. The reset circuit 50 is responsive to the fed back alarm signal $S_{10}$ to produce the reset signal $S_{11}$.

The alarm signal $S_{10}$ produced by the counter 30 is fed to an alarm device 60. The alarm device 60 is responsive to the alarm signal to product an alarm to the driver so as to prevent the driver from dozing at the wheel. The alarm may be an audible signal, a visible sign or any other suitable alarm. For example, a warning chime, buzzer or voice information may be used as the audible signal, a warning lamp or flashing of indicators may be used as the visible sign, or discharging cooler air to the driver's face and so forth can be utilized for an alternate or additional alarm.

Operation of the alarm system of FIG. 1 will be described hereinbelow with reference to FIGS. 2 and 3. The steering angle detector 10 produces the steering angle signal $S_1$ having a value representative of the steering direction and magnitude of steering. As apparent from FIG. 2, the positive component of the steering angle signal $S_1$ shows a left-side steering magnitude and the negative component shows a right-side steering magnitude. Fed to the first level detector 210 are the first reference signals $S_2$ and $-S_2$ (the inverted $S_2$ signal).

Assuming the steering angle signal value $S_1$ becomes larger than the first reference signal value $S_2$ at a time $t_1$ and becomes smaller than the first reference signal $S_2$ at a time $t_4$, the first level detector 210 produces the first level detector signal $S_4$ for a period $p_1$ ($=t_4-t_1$). The timer 250 is responsive to the first level detector signal $S_4$ to produce a pulse signal $S_5$ which has a constant duration (width) $p_2$ which terminates at a time $t_2$. Therefore, the AND gate 260 receives the timer signal $S_5$ within a period from time $t_1$ to time $t_2$. At the same time, the second level detector 220 continuously compares the steering angle signal value $S_1$ with the second reference signal values $S_3$ and $-S_3$, which second reference signal $-S_3$ is inputted via an inverter. As shown in FIG. 2, the steering angle signal value $S_1$ exceeds the second reference signal value $S_3$ at a time $t_3$, after expiration of timer signal duration at time $t_2$. However, the pulse generator 270 produces a pulse signal $S_7$ in response to the second level detector signal $S_6$ produced at time $t_3$, the AND gate 260 does not become conductive to produce discriminator signal $S_8$ since the timer signal $S_5$ is not simultaneously present.

Figure 2:
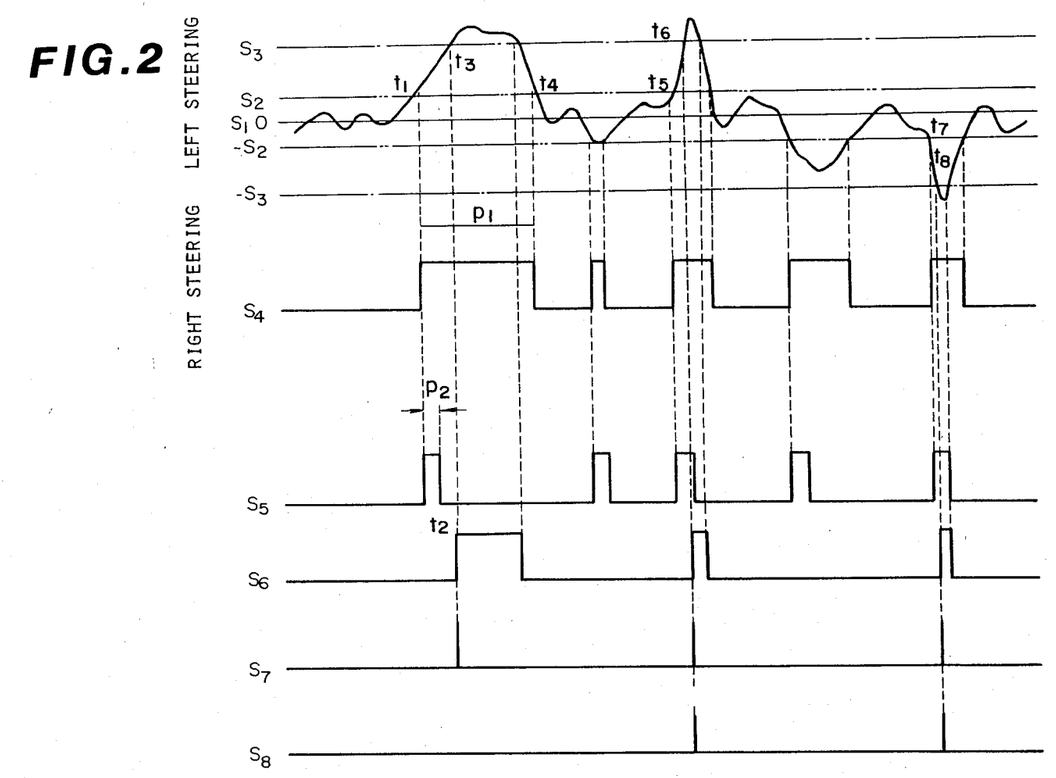
FIG. 2 is a time chart showing function of the steering angle detector, discriminating circuit and counter in the alarm system of FIG. 1.

At time $t_5$ in FIG. 2, the steering angle signal value $S_1$ exceeds the first reference signal value $S_2$, again. The first level detector 210 then produces the first level detector signal $S_4$ and thus timer 250 produces the timer signal $S_5$. The steering angle signal value $S_1$ is further increased to exceed the second reference signal value $S_3$ at time $t_6$ before the timer signal duration $p_2$ has expired. Then, the second level detector 220 produces the second level detector signal $S_6$, and the pulse generator 270 produces the pulse signal $S_7$ in response to the second level detector signal $S_6$. Now, the AND condition of the timer signal $S_5$ and the pulse signal $S_7$ is established. The AND gate 260 thus produces the discriminator signal $S_8$. The discriminator signal $S_8$ is fed to the counter 30 to be counted.

Thereafter right-side steering occurs. Likewise to the foregoing, the first level detector 210 detects the steering angle signal value $-S_1$ smaller than the first reference signal value $-S_2$ to produce the first level detector signal $S_4$, at time $t_7$. The timer 250 thus produces the timer signal $S_5$. The steering angle signal value $-S_1$ is further decreased to become less than the second reference signal value $-S_3$, at time $t_8$ within the timer signal duration $p_2$. Then, the second level detector 220 produces the second level detector signal $S_6$. The pulse generator 270 is responsive to the second level detector signal $S_6$ to produce the pulse signal $S_7$. Thus, AND condition of the timer signal $S_5$ and the pulse signal $S_7$ is established so that the AND gate 260 produces the discriminator signal $S_8$.

Figure 3:
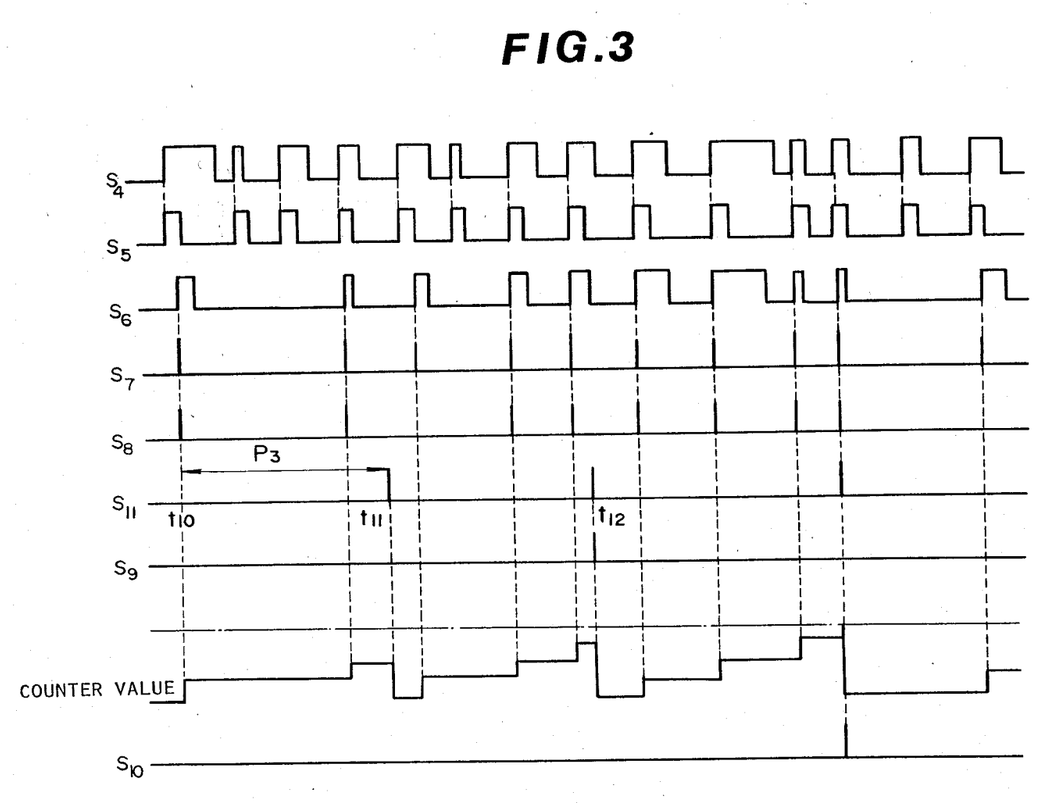
FIG. 3 is a time chart showing operation of the discriminating circuit, reset circuit and transmission gear position detector of FIG. 1.

As shown in FIG. 3, assuming the AND gate 260 produces the discriminator signal $S_8$ at time $t_{10}$, the reset circuit 50 becomes operative in response to the first level detector signal $S_4$ to measure a period of time and produces the reset signal $S_{11}$ when the measure period reaches a preset time $p_3$. Here, the preset time $p_3$ expires at time $t_{11}$. Therefore, the reset signal $S_{11}$ is fed to the counter 30 to clear the counter value at time $t_{11}$. The reset circuit 50 is itself reset after outputting of the reset signal $S_{11}$ so that it is responsive to start timing the period $p_3$ again upon receipt of the next signal $S_4$. Also, the reset circuit 50 as well as counter 30 are reset by the alarm signal $S_{10}$ of the counter 30.

If the transmission gear is shifted at time $t_{12}$, the transmission gear position detector 40 produces the gear shift signal $S_9$. The reset circuit 50 is responsive to produce the reset signal $S_{11}$ to clear the counter value.

If the counter value reaches the predetermined value, e.g., "4", the counter produces the alarm signal $S_{10}$ to be fed to the alarm device 60. The alarm device 60 is responsive to the alarm signal $S_{10}$ to give the driver the alarm for preventing the driver from dozing at the wheel. The alarm signal $S_{10}$ is then fed back to the reset circuit 50. The reset circuit 50 is responsive to the alarm signal $S_{10}$ to produce the reset signal $S_{11}$ for resetting the counter 30.

Figure 4:
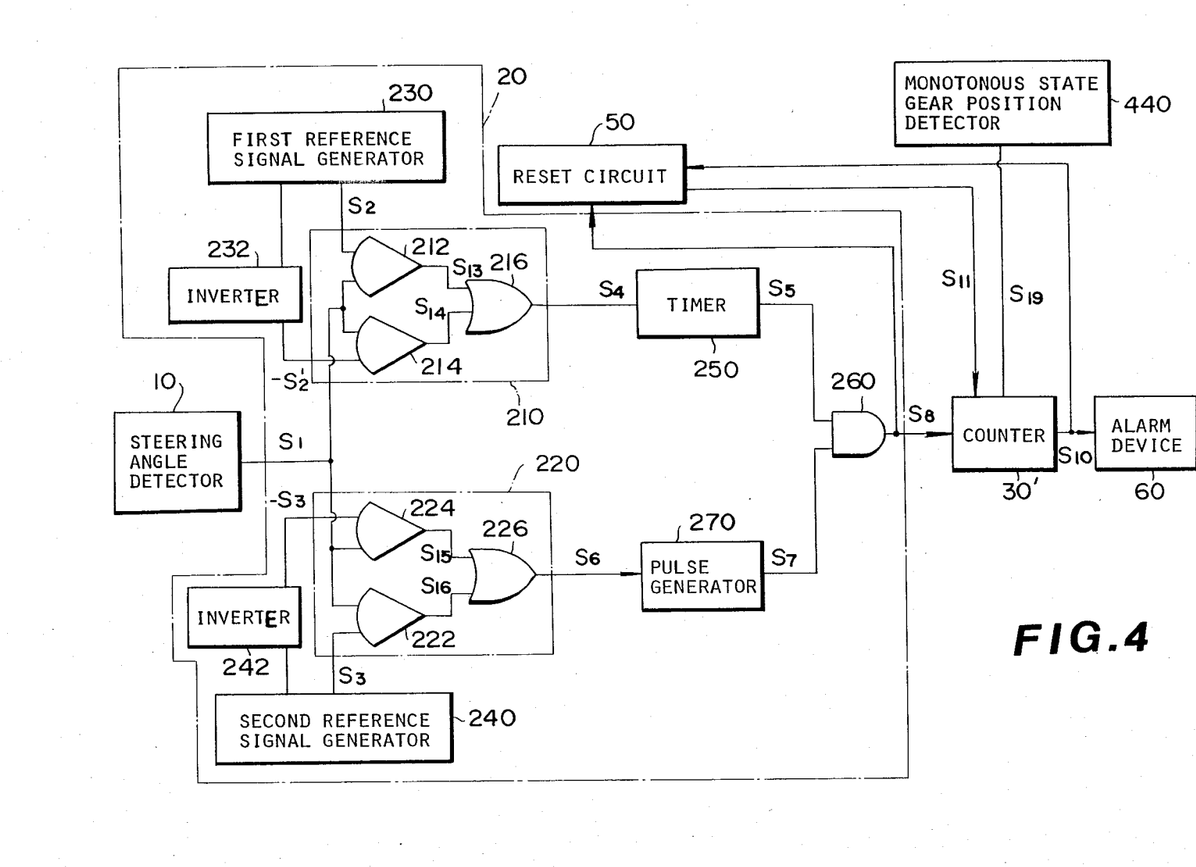
FIG. 4 is a block diagram including schematic circuit diagram of a modification of the alarm system of FIG. 1.
Figure 5:
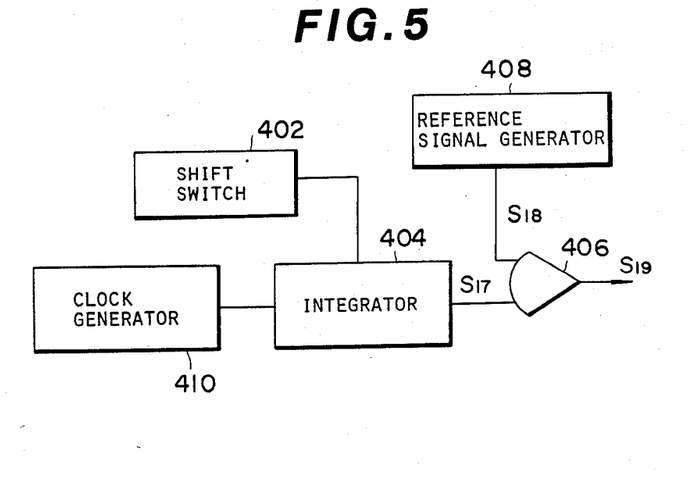
FIG. 5 is a block diagram of a monotonous state gear position detector employed in the preferred embodiment of FIG. 1.
Figure 6:
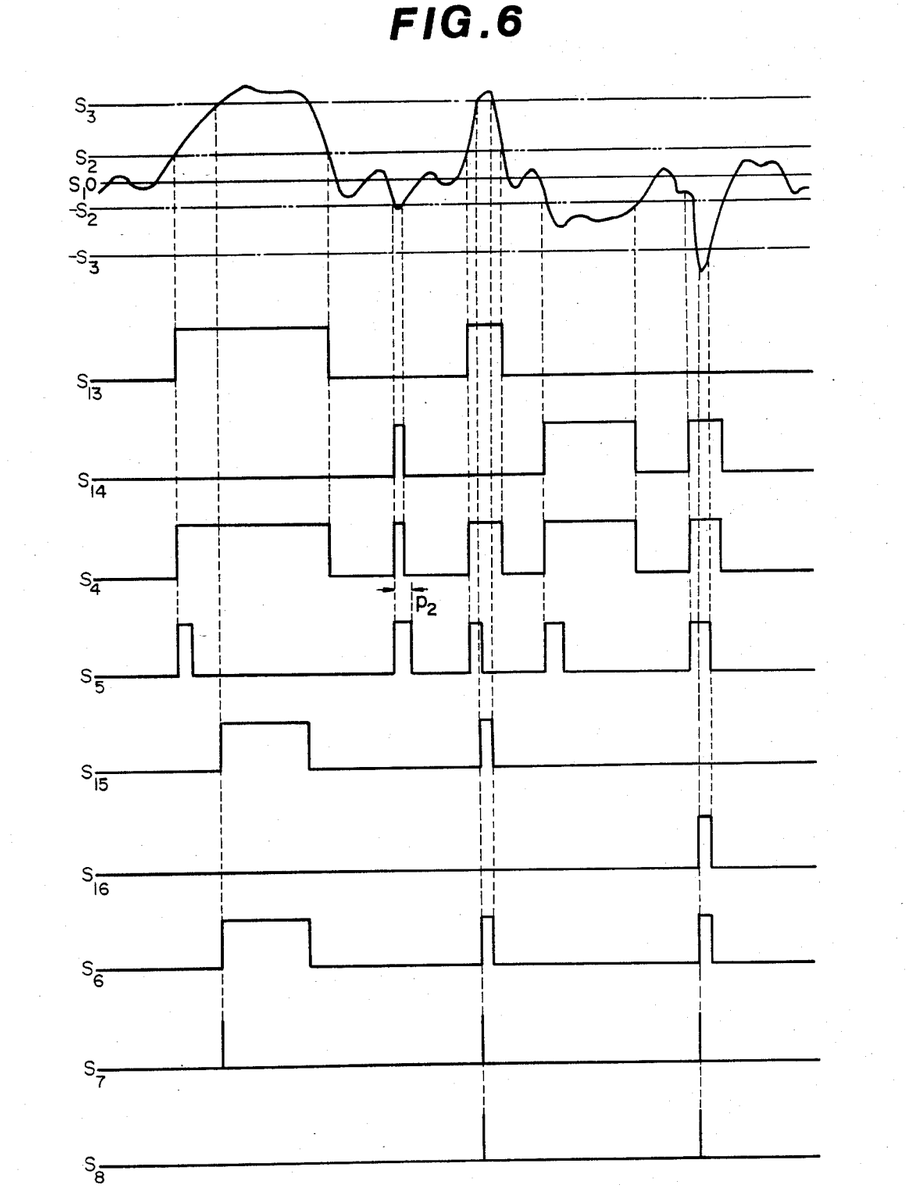
FIG. 6 is a time chart similar to FIG. 2 but showing operation of the circuit of FIG. 4.

Referring to FIGS. 4-6, there is illustrated a circuit diagram showing a modification of the embodiment of the alarm system of FIG. 1. The steering detector 10 comprises a potentiometer variable output value depending on the steering angular position. The steering angle detector 10 is attached to a steering column shaft for varying the output value corresponding to variations of the steering angular position. In the embodiment shown, the steering angle detector is adapted to produce a positive signal $S_1$ when the steering is operated toward the left and a negative signal $-S_1$ when the steering is operated toward the right. Therefore, a positive component of the steering angle signal $S_1$ represents a steering angle toward the left and a negative component therof represents a steering angle toward the right. The steering angle signal $S_1$ is fed to the first and second level detectors 210 and 220 respectively.

The first level detector 210 includes comparators 212 and 214. The comparator 212 is connected with the first reference signal generator 230 to receive the first reference signal therefrom. The comparator 212 compares the positive component of the steering sensor signal $S_1$ with the first reference signal $S_2$ for detecting the steering signal value exceeding the first reference signal value. The comparator 214 is connected with the first reference signal generator 230 via an invertor 232 to receive the inverted first reference signal $-S_2$. The comparator 214 compares the negative component of the steering angle signal $-S_1$. The comparator 212 produces a comparator signal $S_{13}$ when it detects the steering angle signal value $S_1$ larger than the first reference signal value $S_2$. On the other hand, the comparator 214 produces a comparator signal $S_{14}$ when it detects the steering angle signal value $-S_1$ smaller than the inverted first reference signal value $-S_2$. The comparator signals $S_{13}$ and $S_{14}$ is fed to an OR gate 216. The OR gate 216 is responsive either of the comparator signals $S_{13}$ or $S_{14}$ to produce the first level detector signal $S_4$.

The second level detector 220 also includes comparators 222 and 224. The comparator 222 is connected to the second reference signal generator 240 to receive therefrom the second reference signal representative of the second threshold value to be compared with the detected steering angle. The second reference signal value $S_3$ is larger than that of the first reference signal $S_2$. The comparator 224 is connected with the second reference signal generator 240 via an inverter 242 to receive the inverted second reference signal $S_3$. The comparator 222 compares the steering angle signal value $S_1$ with the reference signal value $S_3$ to detect the steering angle signal value exceeding the second reference signal value. The comparator 222 produces a comparator signal $S_{16}$ when it detects the steering angle signal value $S_1$ greater than the second reference signal value $S_3$. The comparator 224 produces a comparator signal $S_{15}$ when it detects the negative component of the steering angle signal $-S_3$. Both of the comparator signals $S_{15}$ and $S_{16}$ are fed to an OR gate 226. The OR gate 226 is responsive to either one of the comparator signals $S_{15}$ and $S_{16}$ to produce the second level detector signal $S_6$.

The first level detector signal $S_4$ is fed to the timer 250. The timer 250 produces the constant duration pulse signal $S_5$ in response to the first level detector signal $S_4$. The second level detector signal $S_6$ is fed to the pulse generator 270. The pulse generator 270 is responsive to the second level detector signal $S_6$ to produce the short duration pulse signal $S_7$. The AND gate 260 receives both of the timer signal $S_5$ and the pulse signal $S_7$ and produces the discriminator signal $S_8$ when the AND condition of the timer signal $S_5$ and the pulse signal $S_7$ is established. The discriminator signal $S_8$ is fed to the counter 30'. A counter 30' counts up the discriminator signal $S_8$ and produces the alarm signal $S_{10}$ when the counted value reaches the given value.

The counter 30' is, in turn, connected with a monotonous state gear position detector 440 which detects a monotonous state of the transmission in which the transmission gear position is maintained at a top gear or an over-drive gear position over a predetermined period of time. As shown in FIG. 5, the monotonous state gear position detector 440 comprises a shift switch 402 which detects the top gear position or the over-drive gear position of the transmission and is turned on when the top or over-drive gear position is detected, an integrator 404 which is connected for charging by pulses from a clock generator 410 in response to the "on" position of the shift switch 402. The integrator 404 is discharged in response to turning off of the shift switch 402. A comparator 406 compares the value of the integrator output $S_{17}$ with that of a reference signal $S_{18}$ produced by a reference signal generator 408 (a constant reference level). The comparator 406 outputs the transmission gear position signal $S_{19}$ so long as the integrator output value $S_{17}$ is maintained at a value greater than that of the reference signal $S_{18}$. The transmission gear position signal $S_{19}$ serves as an enabling signal for the counter 30' to make the latter operative in response to thereto. In other words, termination of the transmission gear position signal $S_{19}$ disables the counter 30' to prevent counting up of the discriminator signal $S_8$ and also clears the counter value.

The counter 30' is further connected to the reset circuit 50 to produce the reset signal $S_{11}$ upon expiration of the preset delay time, e.g. 1 min., from the time AND gate 260 produces the discriminator signal $S_8$. The reset circuit 50 is responsive to the discriminator signal $S_8$ to measure a period of time and produces the reset signal $S_{11}$ when the measured period becomes equal to the preset delay time. During measurement of the time period, the reset circuit 50 is not responsive to further signaling of $S_8$.

The reset signal $S_{11}$ is fed to the counter 30' to reset the counter and to clear the counter value. Therefore, if the counter value does not reach the given or predetermined value within the preset duration, e.g. within 1 min., from the time the reset circuit starts measuring the period, the counter value is cleared so that the counter will not produce the alarm signal $S_{10}$. On the other hand, the alarm signal $S_{10}$ is fed back to the reset circuit 50. The reset circuit 50 is responsive to the alarm signal $S_{10}$ to produce the reset signal $S_{11}$.

Figure 7:
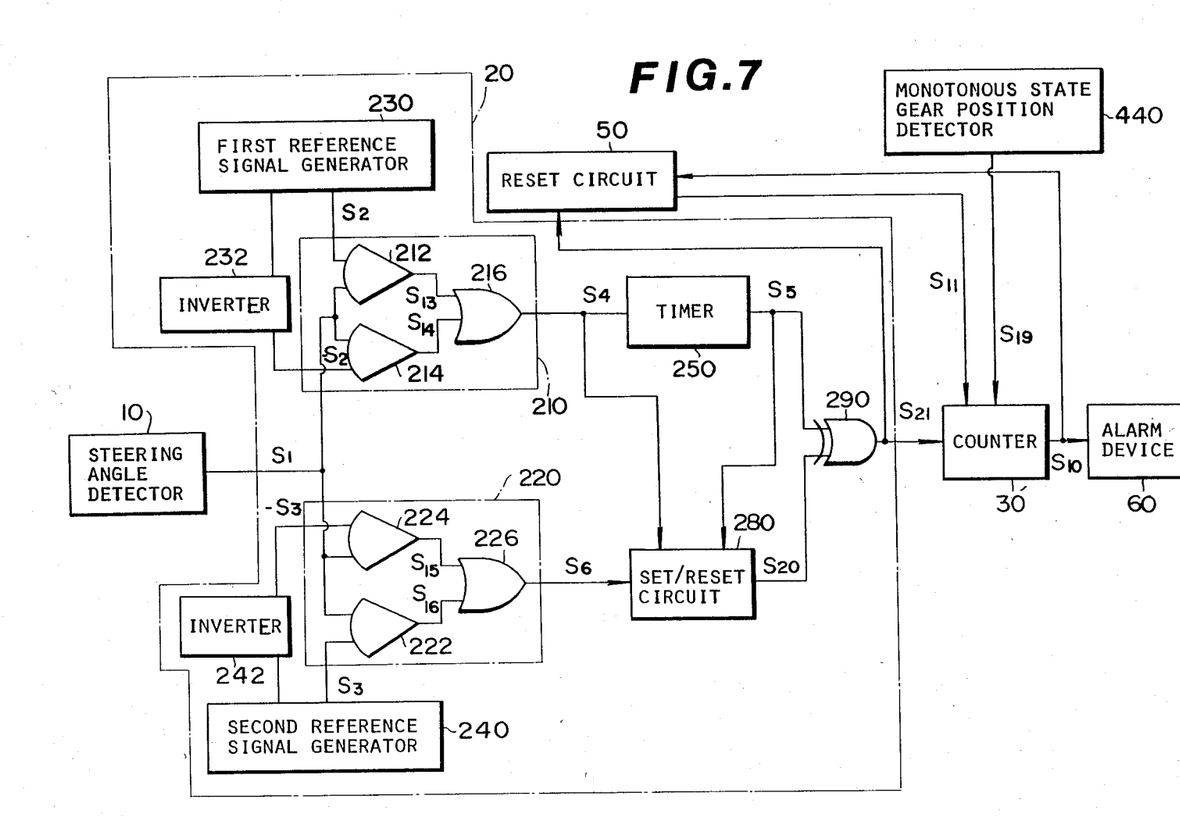
FIG. 7 is a circuit diagram showing a modification of the alarm system of FIG. 4.
Figure 9:
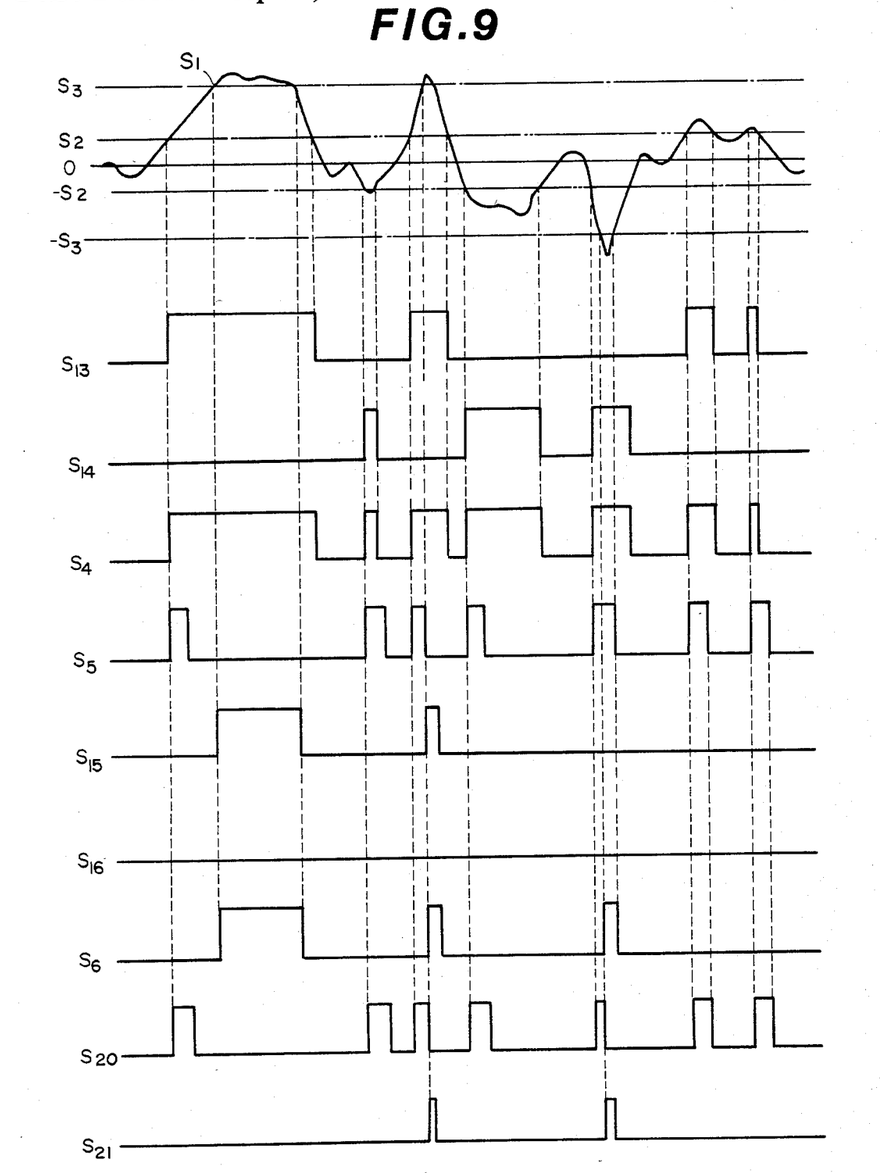
FIG. 9 is a time chart for operation of the alarm system of FIG. 7.

FIG. 7 shows a modification of the foregoing embodiment of the alarm system according to the present invention. In this modification, the pulse generator 270 is replaced with a set/reset circuit 280, such as a flip-flop, and the AND gate 260 is replaced by a gating circuit 290, such as an exclusive OR gate. Other elements in this modification are unchanged. The set/reset circuit 280 turns on in responsive to the first level detector signal $S_4$ and turns off by turning off of the timer signal $S_5$ or in response to the presence of the second level detector signal $S_6$. The set/reset circuit 280 outputs a signal $S_{20}$ while it is maintained in the on position. The gating circuit 290 receives both of the timer signal $S_5$ and the signal $S_{20}$ and becomes conductive when either one (but not both) of these signals is present. Therefore, in practice, the gating circuit 290 becomes conductive only when the second level detector signal $S_6$ is produced within the duration of the timer signal $S_5$ as shown in FIG. 9.

As apparent from hereabove, this modified circuit functions similar to that of the foregoing embodiment.

Figure 8:
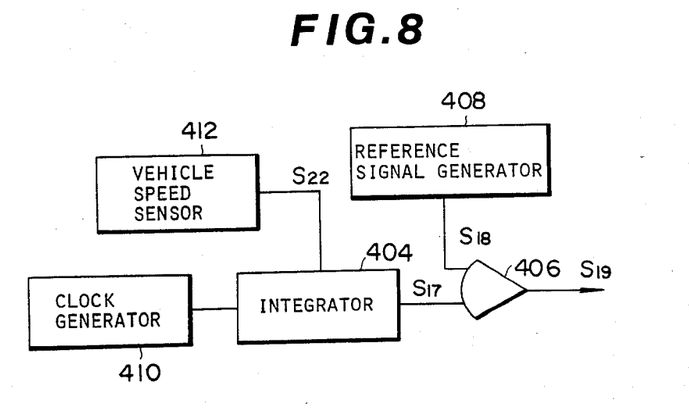
FIG. 8 is a block diagram of another example of the circuit for detecting a monotonous driving condition on the vehicle.

FIG. 8 shows a monotonous state detector which may be used instead of the monotonous state gear position detector 440. In this example, the vehicle speed sensor is used instead of the shifting switch in the previous embodiment. The vehicle speed sensor produces a vehicle speed signal $S_{22}$ when the detected vehicle speed is higher than a predetermined speed. The integrator 404 is responsive to the vehicle speed signal $S_{22}$ to integrate clock signals fed from the clock generator 410. The integrator 404 outputs the integrator signal $S_{17}$ having a value proportional to the integrated value. The integrator signal value is compared with a reference signal value in the compartor 406. The comparator produces a steady vehicle speed signal $S_{19}$ to be fed to the counter 30' to make the latter operative.

As understood hereabove, the present invention fulfills all of the object and advantages sought therefor.

What is claimed is:

1. An alarm system for preventing an automotive vehicle driver from dozing while driving, comprising:
    a steering angle detector for detecting angular displacement of a steering member from a neutral position and producing a first signal having a value which is proportional to the detected displacement;
    a discriminator for detecting a condition wherein said first signal value exceeds a threshold value and detecting a rate of variation of the steering angular displacement higher than a predetermined value, which discriminator produces a discriminator signal when said first signal value exceeds said threshold value and said rate of variation is higher than said predetermined value;
    a counter for counting occurrences of said discriminator signal and producing an alarm signal when the counted value reaches a preset value;
    a counter enabling signal generator associated with said counter and producing a counter enabling signal while a preselected steady cruise condition is satisfied, which enabling signal makes said counter operative to count said occurrences of said discriminator signal while said enabling signal is present and otherwise disables the counter operation and clears the counter value; and
    an alarm device responsive to said alarm signal to produce an alarm for preventing the driver from dozing at the wheel.

2. A system as set forth in claim 1, wherein said discriminator coprises:
    a first detector for detecting exceeding of a first threshold value by the first signal value, and producing a first detector signal;
    a second detector for detecting exceeding of a second threshold value by the first signal value and producing a second detector signal;
    a timer responsive to said first detector signal to produce a constant duration timer signal;
    a pulse generator responsive to said second detector signal to produce a pulse signal; and
    an AND gate producing said discriminator signal when an AND condition of said timer signal and said pulse signal is established.

3. A system as set forth in claim 2, which further increases a reset circuit associated with said counter and producing reset signal to be fed to said counter for reseting the counter operation and clearing the counter value at a given timing.

4. A system as set forth in claim 1, wherein said discriminator comprises:
    a first detector for detecting exceeding of a first threshold value by the first signal value and producing a first detector signal;
    a second detector for detecting exceeding of a second threshold value by the first signal value and producing a second detector signal;
    a timer responsive to said first detector signal and producing a constant duration timer signal;
    a set/reset circuit responsive to said first detector signal to turn into a set condition to produce a set signal and responsive to either one of an end of said timer signal or the presence of said second detector signal to turn into a reset condition; and gating circuit means for producing said discriminator signal when an exclusive OR condition of said timer signal and said set signal is established.

5. An alarm system for preventing an automotive vehicle driver from dozing while driving, comprising:
a steering angle detector for detecting angular displacement of a steering member from a neutral position and producing a first signal having a value which is proportional to the detected displacement;
a discriminator including first and second detectors respectively detecting a condition wherein the first signal value exceeds first and second threshold values, said discriminator measuring a period of time in which said first signal value varies from said first threshold value to said second threshold value and comparing the measured period with a predetermined period to detect a rate of variation of said first signal value larger than a predetermined rate to produce a discriminator signal when the rate of variation of said first signal is detected as being larger than said predetermined rate;
a counter for counting occurrences of said discriminator signal and producing an alarm signal when the counted value reaches a preset value;
a counter enabling signal generator associated with said counter and producing a counter enabling signal while a preselected steady cruise condition is satisfied, which enabling signal makes said counter operative to count said occurrences of said discriminator signal while said enabling signal is present and otherwise disables the counter operation and clears the counter value; and
an alarm device responsive to said alarm signal to produce an alarm for preventing the driver from dozing at the wheel.

6. An alarm system for preventing an automotive vehicle driver from dozing while driving, comprising:
a steering angle detector for detecting angular displacement of a steering member from a netural position and producing a first signal representative of the detected displacement;
a discriminator including first and second detectors respectively detecting a condition wherein the first signal value exceeds first and second threshold values, said discriminator measuring a period of time in which said first signal value varies from said first threshold value to said second threshold value and said discriminator determining occurrence of a rate of variation of said first signal value larger than a predetermined rate to produce a discriminator signal when the rate of variation is detected as being larger than said predetermined rate;
a counter for counting occurrences of said discriminator signal and producing an alarm signal when the counted value reaches a preset value;
a counter enabling signal generator associated with said counter and producing a counter enabling signal while a preselected steady cruise condition is satisfied, which enabling signal makes said counter operative to count said discriminator signal while it is present and otherwise disables the counter operation and clears the counter value; and
an alarm device responsive to said alarm signal to produce an alarm for preventing the driver from dozing at the wheel.

7. A system as set forth in claims 5 or 6, wherein said discriminator further comprises:
a timer responsive to said first detector to produce a constant duration timer signal;
a pulse generator responsive to said second detector to produce a pulse signal; and
an AND gate producing said discriminator signal when an AND condition of said timer signal and said pulse signal is established.

8. A system as set forth in claim 7, which further includes a reset circuit associated with said counter and producing a reset signal to be fed to said counter for resetting the counter and clearing the counter value at a given time.

9. A system as set forth in claim 5 or 6, wherein said discriminator further comprises:
a timer responsive to said first detector and producing a constant duration timer signal;
a set/reset circuit responsive to said first detector to attain a set condition to produce a set signal and responsive to either one of the end of said timer signal or the presence of said second detector signal to attain a reset condition; and
gating circuit means for producing said discriminator signal when an exclusive OR condition of said timer signal and said set signal is established.

10. An alarm system for preventing an automotive vehicle driver from dozing at the wheel, comprising:
first means for detecting variation of a steering angular position and a rate of variation of said steering angular position, said first means producing a first signal when said steering angular position exceeds a predetermined angle and said rate of variation exceeds a predetermined rate;
a counter responsive to occurrences of said first signal to count the occurrences of said first signal and producing a second signal when the counted value reaches a predetermined value;
second means, associated with said counter, for enabling counter operation, which second means detects a vehicle driving condition of a relatively high speed condition and produces a third signal which enables the counter to count up the first signal; and
an alarm device responsive to said second signal to produce an alarm to the vehicle driver for preventing the driver from dozing at the wheel.

11. A system as set forth in claim 10, wherein said second means detects a top or over-drive transmission gear position and produces said third signal when said transmission gear position is maintained in excess of a predetermined period.

12. A system as set forth in claim 10, wherein said second means detects vehicle speed higher than a predetermined speed and produces said third signal when the vehicle speed is maintained higher than the predetermined speed.

13. An alarm system for preventing an automotive vehicle driver from dozing at the wheel, comprising:
first means for detecting variation of steering angular position, said first means including a first detector for detecting a steering angular position shifted from a neutral position in excess of a first predetermined angle and a second detector for detecting the steering angular position exceeding a second predetermined angle and for determining a speed of variation of steering angular position from said first predetermined angle to said second predetermined angle in excess of a predetermined value, said first means producing a first signal when the first detector detects the steering angular position as exceeding said first predetermined angle and said speed of variation as being higher than said predetermined value;

a counter responsive to occurrences of said first signal to count the occurrences of said first signal and producing a second signal when the counted value reaches a predetermined value;

a second means, associated with said counter, for enabling counter operation, which second means detects a relatively high speed condition and produces a third signal which enables the counter to count the occurrences of the first signal; and an alarm device responsive to said second signal to produce an alarm to the vehicle driver for preventing the driver from dozing at the wheel.

14. A system as set forth in claim 13, wherein said second means detects a top gear or over-drive gear position of a transmission and produces said third signal when said transmission gear position is maintained in excess of a predetermined period.

15. A system as set forth in claim 13, wherein said second means detects a vehicle speed higher than a predetermined speed and produces said third signal when the vehicle speed is maintained higher than the predetermined speed.

16. An alarm system for preventing an automotive vehicle driver from dozing at the wheel, comprising:

a steering angle detector for detecting angular displacement of a vehicle steering member to produce a first signal having a value representative of the magnitude of said angular displacement of the steering member;

a discriminator receiving said first signal for detecting a rate of angular displacement of the steering member to produce a second signal when the detected rate is higher than a given threshold;

a counter for counting occurrences of said second signal and producing an alarm signal when the counter value reaches a predetermined value; and means for detecting a vehicle driving condition for enabling and disabling said counter depending upon the detected vehicle condition, said means being responsive to satisfying of a predetermined steady cruise condition by the vehicle driving condition to enable said counter and disabling the couner otherwise.

17. An alarm system for preventing an automotive vehicle driver from dozing at the wheel, comprising:

a steering angle detector for detecting angular displacement of a vehicle steering member to produce a first signal having a value representative of the magnitude of said angular displacement of the steering;

a discriminator for detecting abrupt steering operation based on variation of the first signal value to produce a second signal when the rate of variation of said first signal becomes higher than a given threshold and whereby the abrupt steering operation is detected;

a counter adapted to count occurrences of said second signal for producing an alarm signal when the counter value reaches a predetermined value; and means for detecting a vehicle driving condition for enabling said counter while the detected vehicle driving condition satisfies a given condition showing steady cruise condition and for disabling the counter otherwise.

18. An alarm system for preventing an automotive vehicle driver from dozing at the wheel, comprising:

a steering angle detector for detecting angular displacement of a vehicle steering member to produce a first signal having a value representative of the magnitude of said angular displacement of the steering;

a discriminator for detecting a condition wherein said first signal value exceeds a predetermined value and a variation rate of said first signal value exceeds a given threshold to detect abrupt steering operations, to produce a second signal;

a counter for counting occurrences of said second signal for producing an alarm signal when the counter value reaches a predetermined value; and means for enabling and disabling said counter depending upon a vehicle driving condition, said means enabling said counter when the vehicle is driven in a steady cruise state and disabling the counter otherwise.

19. An alarm system for preventing an automotive vehicle driver from dozing at the wheel, comprising:

a steering angle detector for detecting angular displacement of a vehicle steering member to produce a first signal representative of the magnitude of said angular displacement of the steering member;

a discriminator for detecting an abrupt steering operation based on a condition wherein said first signal represents a magnitude beyond a predetermined value and further based on a rate of variation of said first signal value, said discriminator producing a second signal when the abrupt steering operation is detected;

a counter for counting occurrences of said second signal to produce an alarm signal when the counter value reaches a predetermined value; and means for enabling and disabling said counter, said means enabling said counter when a vehicle driving condition representing a given steady cruise condition is detected and disabling the counter otherwise.

* * * * *